United States Patent
Godlieb (10) Patent No.: US 11,351,686 B2
(45) Date of Patent: Jun. 7, 2022

(54) HAIRCUT RECORDING DEVICE, METHOD AND SYSTEM

(71) Applicant: KONINKLIJKE PHILIPS N.V., Eindhoven (NL)

(72) Inventor: Robert Godlieb, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 996 days.

(21) Appl. No.: 15/777,257

(22) PCT Filed: Dec. 21, 2016

(86) PCT No.: PCT/EP2016/082158
§ 371 (c)(1),
(2) Date: May 18, 2018

(87) PCT Pub. No.: WO2017/108937
PCT Pub. Date: Jun. 29, 2017

(65) Prior Publication Data
US 2018/0370050 A1 Dec. 27, 2018

(30) Foreign Application Priority Data
Dec. 22, 2015 (EP) .................................. 15202124

(51) Int. Cl.
*B26B 19/38* (2006.01)
*G08B 7/06* (2006.01)
(Continued)

(52) U.S. Cl.
CPC .............. *B26B 19/388* (2013.01); *G08B 7/06* (2013.01); *G08B 21/182* (2013.01); *G09B 5/02* (2013.01); *G09B 19/24* (2013.01); *B26B 19/20* (2013.01)

(58) Field of Classification Search
CPC .......... G08B 7/06; G08B 21/182; G09B 5/02; G09B 19/24; B26B 19/388
(Continued)

(56) References Cited

U.S. PATENT DOCUMENTS 2,581,704 A  1/1952 Reno
3,413,985 A  12/1968 Dlouhy
(Continued)

FOREIGN PATENT DOCUMENTS

DE  19835331 A1  2/2000
FR  2964023 A1  3/2012
(Continued)

*Primary Examiner* — Thomas J Hong
*Assistant Examiner* — Sadaruz Zaman (57) ABSTRACT

A haircut recording method, system and device, include a computing device having a feedback unit, and a hand-held device having a hair property measurement unit. The measurement unit is configured to detect a hair property value of interest, such as a hair length representing value, when the measurement unit is arranged adjacent to a haired portion. A position detection unit is configured to detect an actual position of the measurement unit. A record control unit is configured to operate the position detection unit for tracking the actual position of the measurement unit, operate the measurement unit for assigning detected hair property values to position values, deduce a condition parameter, such as a quality parameter, and provide user feedback based on the deduced condition parameter.

19 Claims, 7 Drawing Sheets

(51) Int. Cl.
*G08B 21/18* (2006.01)
*G09B 5/02* (2006.01)
*G09B 19/24* (2006.01)
*B26B 19/20* (2006.01)

(58) Field of Classification Search
USPC ......................................................... 434/219
See application file for complete search history.

(56) References Cited

U.S. PATENT DOCUMENTS

| | | | | |
|---|---|---|---|---|
| 3,570,500 | A | * | 3/1971 | Berry ...................... B26B 19/00 132/213 |
| 5,305,767 | A | | 4/1994 | Ivanov |
| 6,973,931 | B1 | * | 12/2005 | King ...................... A45D 19/02 132/212 |
| 7,621,748 | B2 | * | 11/2009 | Bajer ...................... G09B 5/00 434/118 |
| 9,778,631 | B2 | * | 10/2017 | Krenik ................ B26B 21/4081 |
| 2007/0269772 | A1 | * | 11/2007 | Taya ...................... A45D 44/14 434/94 |
| 2012/0234146 | A1 | * | 9/2012 | Lakin ...................... B26B 19/00 83/76.2 |
| 2013/0042487 | A1 | * | 2/2013 | Julemont .............. B26B 19/063 30/277.4 |
| 2014/0331503 | A1 | * | 11/2014 | Uit De Bulten ........ B26B 19/12 30/201 |
| 2015/0059187 | A1 | * | 3/2015 | Krenik .................... B26B 19/42 30/123 |
| 2015/0059796 | A1 | | 3/2015 | Park |
| 2015/0197016 | A1 | * | 7/2015 | Krenik .................. B26B 19/388 83/13 |
| 2015/0217465 | A1 | * | 8/2015 | Krenik .................. B26B 19/388 700/90 |
| 2016/0297085 | A1 | * | 10/2016 | Uit De Bulten ....... A61B 17/54 |
| 2019/0224870 | A1 | * | 7/2019 | Robinson .............. B26B 21/227 |
| 2019/0232510 | A1 | * | 8/2019 | Zandsteeg ................ G01D 5/20 |
| 2020/0016006 | A1 | * | 1/2020 | Van Den Hout ..... H04R 1/1058 |
| 2020/0023529 | A1 | * | 1/2020 | Zandsteeg ............ B26B 19/388 |

FOREIGN PATENT DOCUMENTS

| | | | |
|---|---|---|---|
| GB | 1245357 A | | 9/1971 |
| WO | 1999022694 A2 | | 5/1999 |
| WO | 2013096572 A1 | | 6/2013 |
| WO | 2013163999 A1 | | 11/2013 |
| WO | 2015067489 A1 | | 5/2015 |
| WO | 2015068068 A1 | | 5/2015 |
| WO | WO-2015068068 A1 | * | 5/2015 ............. A45D 24/36 |

* cited by examiner

HAIRCUT RECORDING DEVICE, METHOD AND SYSTEM

This application is the U.S. National Phase application under 35 U.S.C. § 371 of International Application No. PCT/EP2016/082158, filed on Dec. 21, 2016, which claims the benefit of European Application No. 15202124.2 filed on Dec. 22, 2015. These applications are hereby incorporated by reference herein.

FIELD OF THE INVENTION

The present invention relates to a haircut recording method, a haircut recording system, and a haircut recording device. The disclosure further relates to a corresponding computer program.

As used herein, haircut recording particularly relates to an approach that involves haircut recording subsequent to a hair cutting operation. That is, an already present haircut is recorded, scanned, sampled, etc. In other words, hair cutting parameters are obtained in a reverse fashion, based on the already present haircut. Hence, data describing the haircut can be obtained. Haircut recording data obtained in this way may be utilized at a subsequent state to reproduce the haircut that was present at the time of recording.

BACKGROUND OF THE INVENTION

Haircutting and hairstyling are, to a great extent, manual tasks which typically require a skilled operator (hair stylist, hair dresser, etc.) who performs a haircut and/or hairstyling operation at a client. Generally, even if the client is satisfied with a particular haircut or hairstyle, the manual task needs to be performed repeatedly, for instance every four to eight weeks for relatively short haircuts. Further, even a well-experienced hairdresser or hairstylist cannot always exactly reproduce a certain haircut. The hairdresser may, on the one hand, imagine the to-be-applied haircut based on the current (grown) state of the hair. On the other hand, the hairdresser may recall and visualize the originally processed state of the previously performed haircut. Further, a client may choose and request a certain haircut by pointing at a visual representation of his/her own or other people wearing a model haircut.

Several attempts have been made to provide smart haircutting appliances which allow a user to cut his/her hair or the hair of another person in a machine supported and controlled fashion. To this end, a haircutting appliance may be provided which is arranged to adjust a present cutting length dependent on a certain position at the head of the to-be-treated person. In other words, the desired haircut is stored in a computing device which is arranged to operate the haircutting appliance accordingly, for instance by adjusting a movable spacing comb. However, this basically requires that the model of the haircut is already stored in the computing device. It has been proposed to record machine parameters of the haircutting appliance when the haircut is actually performed. This may involve recording a plurality of pairs of values indicating a respective cutting length at a respective position.

In this context, WO 2013/163999 A1 discloses a programmable hair trimming system comprising a hair trimming device, said hair trimming system being arranged to detect, by means of an electromagnetic tracking system, the position of the hair trimming device in relation to the head of a person on whom a hair trimming is being performed; relate said position to previously generated hair length profile data regarding the desired hair trimming length at various positions; automatically and dynamically adjust the hair trimming length of said hair trimming device according to its present position and the hair length profile data.

WO 2013/096572 A1 discloses an automated system for cutting hair on a subject to conform to a specified style, the system comprising a hair cutting device configured to engage a cutting mechanism to cut said hair on said subject; and a positioning structure operable to interact with said hair cutting device to determine a position of said hair cutting device relative to a reference point.

Further reference is made to FR 2 964 023 A1 which discloses a method for processing a hair treatment, the method involving determining, for assistance in hair treatment, a position of a hand or a hand part relative to scalp or a fake head, using a positioning system. Corresponding information is delivered to a user using a positioning system based on the position of the hand or the hand part, so as to perform a preset action on the hair. FR 2 964 023 A1 further proposes to measure the length of hair so as to define a hair model.

WO 1999/022694 A2 discloses a method of programming a hairstyle into a system involving empirical sensor measurements from a specific individual's head so as to duplicate a haircut, wherein a hair presence sensor is placed at a position where it can monitor the presence of hairs in a processing area. At the processing area, a hair chamber is provided. Further, a means for pulling hair lengthwise through a chamber is provided. When the hair presence sensor detects that most hairs have been pulled through the chamber past their tips, the computer records the hair length at this specific point on the head. It is proposed to move the hair presence sensor through all of the hair on the head using a standardized pattern as so to measure the length at a plurality of points.

A manual hair measurement tool is known from US 2015/0059796 A1, the tool comprising an elongated member where scale lines are indicated with intervals at a predetermined length unit from one end in a length direction thereof, and the elongated member is configured, by placing an end part on a scalp, to be used for performing hair length measurements based on the scale lines, wherein a concave part is formed in the end part, and a gap between the concave part and the scalp occurs by placing the end part on the scalp so that both end parts in a width direction of the concave part contact with the scalp.

However, in practical use, the proposed approach shows only a limited accuracy and performance. A large amount of manual intervention is necessary so as to eventually create a hair model which sufficiently represents the present haircut.

Consequently, there is a certain need for improvements in and alternative approaches to a subsequent recording of the present haircut in the aftermath of a haircutting operation. On the one hand, a user may want to imitate a professional haircut he or she received at a professional hairdresser. On the other hand, some haircuts are best-looking only after a certain time (e.g. a few days or even one or two weeks) following the visit at the hairdresser's saloon. Hence, there is still room for improvement in haircut recording appliances and methods.

SUMMARY OF THE INVENTION

It is an object of the present disclosure to provide a haircut recording method, a haircut recording system and a corresponding haircut recording device which facilitate and improve a haircut recording process which is performed subsequent to the actual haircut operation. Preferably, an improved reverse design/reverse engineering approach is presented which enables data collection with relatively little effort, particularly with considerably little time expenditures. Preferably, the method and system in accordance with the present disclosure are enabled to adapt recording parameters dependent on detected hair property values. It would be further preferred that, in accordance with the method, system and device of the present disclosure, a user can be guided and instructed so as to specifically continue and modify the haircut recording operation which may involve indicating locations where further measurements and/or refinements are required.

In a first aspect of the present disclosure there is provided a haircut recording method comprising the following steps:

providing a hair property measurement unit, particularly a hair length measurement unit, arranging the measurement unit adjacent to a haired portion and moving the measurement unit through hair, detecting an actual position of the measurement unit, detecting a hair property value of interest, particularly a hair length representing value, recording a present haircut, including:

tracking the actual position of the measurement unit, assigning detected hair property values to position values, deducing a condition parameter, particularly a quality parameter, and user feedback based on the deduced condition parameter.

In a further aspect of the present disclosure a haircut recording system is presented, the system comprising:

a computing device comprising a feedback unit, a hand-held device comprising a hair property measurement unit, the measurement unit being arranged for detecting a hair property value of interest, particularly a hair length representing value, when the measurement unit is arranged adjacent to a haired position and moved through hair, a position detection unit arranged for detecting an actual position of the measurement unit, a record control unit arranged to:

operate the position detection unit for tracking the actual position of the measurement unit, operate the measurement unit for assigning detected hair property values to position values, deduce a condition parameter, particularly a quality parameter, and provide user feedback based on the deduced condition parameter.

In yet another aspect of the present disclosure there is provided a haircut recording device, particularly a hand-held device, comprising an engagement section arranged to engage a haired portion of a subject of interest, a hair property measurement unit, a position indicating section, and a control interface arranged to communicate with a remote computing device, wherein operational data is exchanged via the control interface, the operational data comprising positional data and hair property data, particularly hair length data, wherein the device is arranged to cooperate with a positional reference, and with a hair profile allocation section of the remote device, and wherein the measurement unit is operable in a basic setting involving a coarse-meshed measurement, and in a fine setting involving a fine-meshed measurement. The coarse-meshed measurement may be also referred to as low resolution measurement. The fine-meshed measurement may be also referred to as high resolution measurement.

Main aspects of the present disclosure are based on the insight that the act of reversely recording a present haircut may be greatly simplified and improved by evaluating already recorded samples and, based on the evaluation, by providing user feedback so as to influence the remaining recording process. By way of example, a subject of interest (a person wearing a haircut which is to be recorded) may have large haired regions where hair properties are relatively constant. For instance, the hair length may be relatively constant at a large portion of the scalp of the monitored person (also referred to as subject of interest herein). Further, so-called transition regions may be present in which hair property values significantly change. This may for instance involve a length change.

Hence, respectively recorded values may be assessed so as to determine whether or not such a transitional region is present. So as to further improve the accuracy of the haircut recording, the user of the device may be then prompted to repeatedly move the measurement unit to the transition region and/or to move the measurement unit slower through the transition region so as to enable a more accurate sampling. This may generally apply to regions where the coarse measurement revealed unexpected results, e.g. an unexpected rate of change of the hair length.

Generally, measured data may be acquired in different ways. For instance, so-called spot measurement may be performed, wherein the user approaches or taps respective haired portions which are then measured or sampled. Consequently, the user may successively sample a number of spots of the hair so as to generate a hair property map. Between two measurement spots, no explicit hair contact or skin contact is required.

Another option is to move the device along the haired portion, for instance while keeping at least a loose contact with the haired skin or scalp. Then, sampling may be performed at a certain sampling rate which involves that a number of hair property samples is obtained at a certain movement stroke of the device.

As used herein, the user may be the haircut wearing person itself, or may be another person assisting in the recording process.

Generally, when performing the haircut recording operation, a data set may be generated including a mapping of hair property values and position values. Correspondingly, a large number of pairs of values may be obtained respectively comprising a position value and a corresponding hair property value, particularly a hair length value. A hair property value may also involve a hair density at a current location, the presence of curls at a certain location, a hair color, moisture content, dermal properties, etc.

Eventually, a virtual map of the haired portion, particularly the head hair may be generated. The virtual map may be referred to as topological hair map since a hair length profile may be obtained in this way.

The actual position of the measurement unit may be detected based on a position indicating value with respect to a position reference. For instance, a head or scalp model may be provided to which a number or pattern of measurement values is applied. Hence, a certain data point at the head may be described by a two-dimensional or three-dimensional representation.

As used herein, the term condition parameter (or quality parameter) shall be understood as a controlled value or a set of controlled values which is/are based on the recorded hair property values. For instance, the condition parameter may include a sampling coverage, a sampling density (samples per length/area unit) or rate, a hair property alteration change, and suchlike. Needless to say, the condition parameter may be based on a combination of respective values. Further, the condition parameter may involve an absolute or relative signal change, particularly a hair length change. Further, the condition parameter may involve deviations of a measured value from an expected value which, for instance, may result from an interpolation, or may be model-based. In one embodiment of the method, the condition parameter is based on at least one of the following parameters:

a length value, particularly an absolute length value or a relative length value, a positional value, particularly a head topology value, a movement speed value, particularly an absolute movement speed value or a relative movement speed value, a sampling parameter, particularly a sampling density or a sampling rate, a rate of change value, particularly a rate of temporal change value or a rate of positional change value, and an area coverage value.

Also a combination of at least two of the above parameters may be used. A sampling density may involve a number of samples per unit area and/or per path length unit. A sampling rate typically involves a number of samples per time unit. The rate of change value may involve a rate of temporal change of the hair property value and a rate of positional change of the hair property value.

In one embodiment of the hair recording method, a coarse-measurement may be applied which may be supplemented by a sectional fine-meshed measurement so as to increase the sampling density or sampling rate at transition regions, for instance.

In another embodiment of the method the step of recording a present haircut further involves:

monitoring the condition parameter, detecting a deviation of the condition parameter, and providing corrective user feedback so as to reduce the detected deviation.

In this way, a control loop may be established which further improves the quality of the haircut recording procedure. Hence, the presence of transition zones may be detected when for instance huge value changes occur which are reflected in a high rate of change. Consequently, a respective condition parameter would take respective values and indicate that a deviation from a target value or a target range is present. For instance, in a region of a constant hair length, a sampling density of two values per length unit or of four values per area unit may be sufficient. However, in a transition region, it may be desired to obtain a sampling density of four values per length unit and 16 values per area unit, respectively. Consequently, the user may be prompted to conduct further measurements, or to repeat the recording process at the transition region. Generally, a goal is to acquire further samples in the transition region, i.e. to increase the sample density.

In another embodiment of the haircut recording method, the step of providing user feedback includes at least one of the following steps:

requesting a repetition of a previous move of the measurement unit, requesting a deceleration when moving the measurement unit, indicating a transitional region where huge length changes are present in neighbouring portions, indicating a region where a refined measurement is requested, and indicating a region where no measurement has been performed so far.

Consequently, the user may be guided in a targeted fashion so as to accomplish the haircut recording procedure with the requested accuracy and within a reasonably short time period.

In yet another embodiment of the haircut recording method the step of providing user feedback further includes at least one of the following steps:

providing visual feedback, providing haptic feedback, and providing sound feedback.

Visual feedback may be provided at a remote device, for instance by pointing at a certain region of a representation of the head of the subject of interest. Haptic feedback may involve force feedback generated by a vibration source. Sound feedback may involve directional information, positional information, etc. To some extent, haptic feedback and/or sound feedback may be provided at the measurement unit. Hence, it may be indicated at the measurement unit to perform the measurement in a slower fashion so as to enable a higher sample density. Also visual feedback may be provided at the measurement unit, for instance by using indicators, arrows and such like so as to guide the user that handles the measurement unit. Feedback may also involve an indication directly at the person's head, e.g. by marking or highlighting to-be-refined portions. To this end, light spots or laser spots may be used.

In yet another embodiment of the haircut recording method the measurement unit is operable in a basic setting involving a coarse-meshed (low sample resolution/density) measurement, and in a fine setting involving an at least sectionally applied fine-meshed (high sample resolution/density) measurement. Needless to say, the measurement unit may be operable in more than two settings. Consequently, a fine-graduated measurement may be performed. By way of example, based on already obtained samples, estimated values for the next samples may be calculated. In case an actually recorded value differs significantly from the predicted value, the user may be prompted to refine the measurement.

In one embodiment of the haircut recording system, the record control unit comprises a control loop section which is arranged to monitor the condition parameter, detect a deviation of the condition parameter, and provide corrective user feedback so as to reduce the detected deviation.

In a further embodiment of the haircut recording system the user feedback is provided via at least one of the computing devices, particularly a display thereof, and the handheld device, particularly a haptic actuator or a sound source thereof. Also a combined feedback via the computing device and the haptic actuator may be provided.

In yet another embodiment of the haircut recording system, the hair property measurement unit is arranged as a hair length measuring unit. Several approaches to hair length measurement are discussed, for instance, in WO 1999/022694 A2, FR 2 964 023 A1, and in US 2015/0059796 A1. The system may utilize similar approaches.

In another embodiment of the haircut recording system, the position detection unit includes a positional reference and a relative position detection unit for detecting a position of the measurement unit with respect to the positional reference. In this context, reference is made to WO 2013/163999 A1. Consequently, a wearable positional reference may be provided which is worn by the subject of interest when the present haircut is recorded.

In another exemplary embodiment of the haircut recording system, the position detection unit is arranged to detect an absolute, global position of the measurement unit. To this end, optical measurement may be utilized, for instance camera-based measurement. Further, electromagnetic radiation may be utilized so as to determine the position of the measurement unit.

In yet another embodiment of the haircut recording system, the position detection unit is arranged as a mediate position detection unit for detecting a present topology, particularly a head topology, based on a plurality of position measurement samples, and for matching the topology and an overall topology model.

For instance, the position detection unit may comprise acceleration sensors which are arranged to detect and track movement of the position detection unit. Hence, when the position detection unit is moved in accordance with a particular pattern around a head, preferably in contact with the skin or scalp, the obtained signals may be matched with a head topology model. Consequently, the obtained values may be mediately assigned to a head model.

Needless to say, also a combined position detection measurement approach may be used, for instance combined relative position and absolute position detection. Acceleration sensors may further refine the tracking and position detection process, and also the user guidance since it may be monitored whether the user actually moves the device in accordance with the provided suggestion.

In an exemplary embodiment of the haircut recording device, the device is arranged as one of a haircutting appliance, particularly a haircutting appliance comprising an attachment, for instance a comb attachment, which is arranged for hair length measurement, and a restricted-purpose recording device for recording a present haircut. When the device is arranged as a haircutting appliance, the device is operable in a haircutting mode and in a haircut recording mode. As indicated above, it is preferred that in the haircut recording mode, no haircutting operation is performed. Rather, it is intended to detect and sample the previously performed haircut in a downstream operation; i.e. generally there is a temporal offset between the hair cutting action and the haircut recording action.

As used herein, the term restricted-purpose recording device shall refer to a device which is not arranged for haircutting operations. Rather, the restricted-purpose device may be referred to as a recording device whose main purpose is to record the present haircut. Consequently, the restricted-purpose device may be arranged as a single-purpose haircut recording device.

In yet another aspect of the present invention there is provided a computer program which comprises program code means for causing a computing device to perform the steps of the methods as discussed herein when said computer program is carried out on that computing device.

The program code can be encoded in one or more non-transitory, tangible media for execution by a computing machine, such as a computer. In some exemplary embodiments, the program code may be downloaded over a network to a persistent memory unit or storage from another device or data processing system through computer readable signal media for use within the system. For instance, program code stored in a computer readable memory unit or storage medium in a server data processing system may be downloaded over a network from the server to the system. The data processing device providing program code may be a server computer, a client computer, or some other device capable of storing and transmitting program code.

As used herein, the term "computer" may stand for a large variety of processing devices. In other words, also mobile devices having a considerable computing capacity can be referred to as computing devices, even though they provide less processing power resources than standard "computers". Needless to say, such a "computer" can be part of a personal care device and/or system. Furthermore, the term "computer" may also refer to a distributed computing device which may involve or make use of computing capacity provided in a cloud environment. The term "computer" or "computing" may also relate to medical technology devices, health tech devices, personal care devices, fitness equipment devices, and monitoring devices in general, that are capable of processing data. Any automated information processing device or system capable of processing respective data may be referred to as computing device.

Preferred embodiments of the disclosure are defined in the dependent claims. It should be understood that the claimed method and the claimed computer program can have similar preferred embodiments as the claimed system and the claimed device and as defined in the dependent system/device claims.

BRIEF DESCRIPTION OF THE DRAWINGS

These and other aspects of the invention will be apparent from and elucidated with reference to the embodiments described hereinafter. In the following drawings

DETAILED DESCRIPTION OF THE EMBODIMENTS

Figure 1:
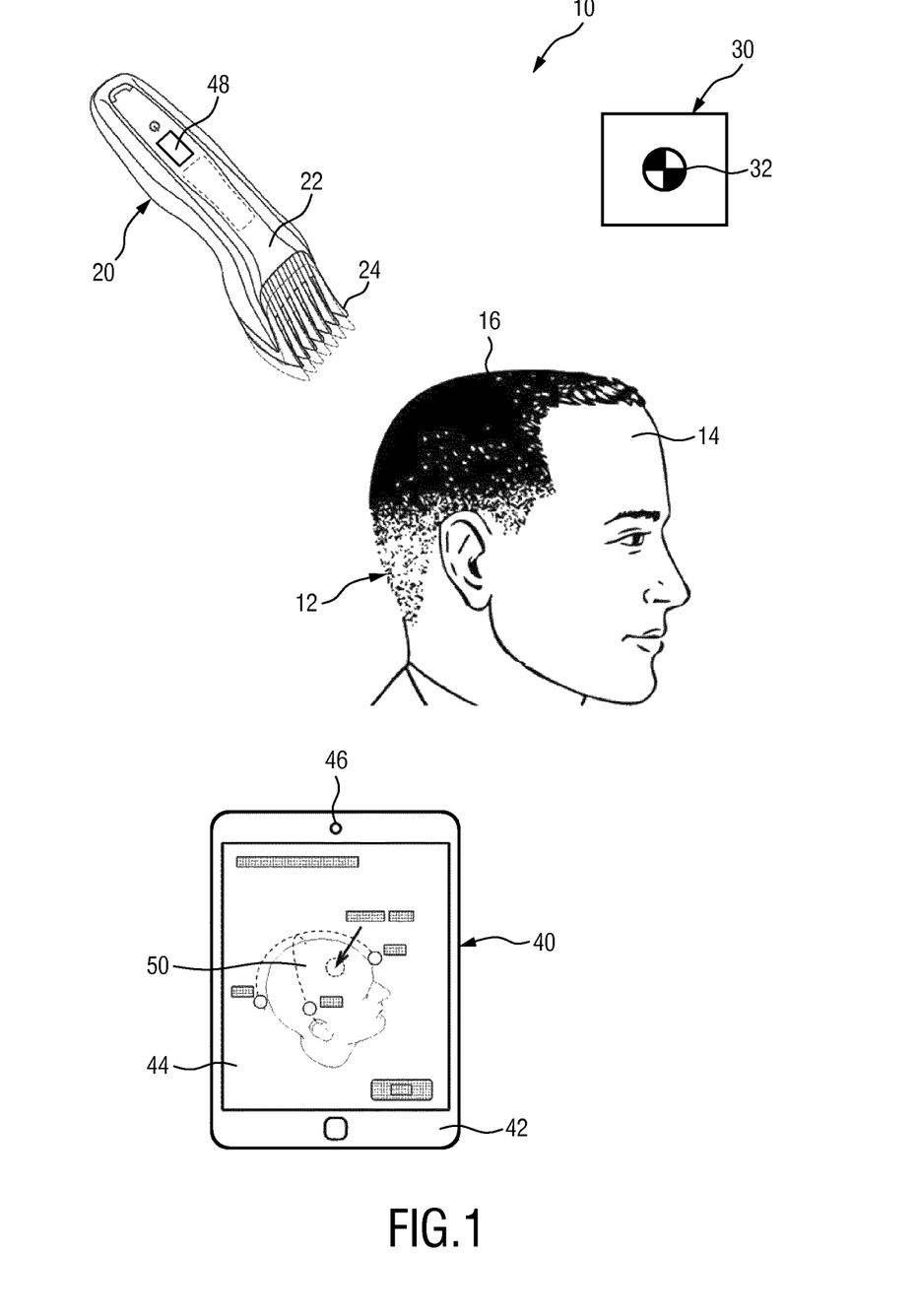
FIG. 1 shows a simplified general layout of an exemplary embodiment of a haircut recording system.

FIG. 1 shows a simplified schematic illustration of a haircut recording system 10. The haircut recording system 10 is arranged to record a present haircut of a client or subject 12 for the purpose of operating a haircutting appliance accordingly so as to reproduce the haircut on demand. In FIG. 1, a haired portion 16 at a head portion 14 of the subject 12 is illustrated.

The system 10 comprises a device 20 which is arranged as a hand-held or hand-guided device. The device 20 may imitate the form of a haircutting appliance and/or may be arranged as a haircutting appliance supplemented by a recording unit. Generally, the device 20 may be grasped by a user and operated so as to record the present haircut at the subject 12. This may involve moving the device 20 through the haired portion 16.

The device 20 may be held and operated by the subject 12 itself (whose haircut is to be recorded). In the alternative, the device 20 may be operated by another person. The operator of the hand-held device 20 shall be referred to hereinafter as the user.

The device 20 comprises a measurement unit 22. For instance, a comb 24 may be provided at the device 20 which is operatively coupled with the measurement unit 22. The comb 24 is arranged to be moved through hair and to detect and measure a current length of the haired portion the comb 24 is actually contacting/engaging.

Further, the system 10 comprises a position detection unit 30 which is schematically indicated in FIG. 1 by a simplified block. The position detection unit 30 comprises a positional reference 32. The position detection unit 30 may be also referred to as tracking unit. There exist several embodiments of the position detection unit 30. Generally, the main purpose of the position detection unit 30 is to detect a current position of the device 20 with respect to the haired portion 16 or the head portion (scalp) 14 of the subject 12. Consequently, pairs of values may be obtained which comprise, on the one hand, an actual position and, on the other hand, a hair property value, particularly a hair length value, assigned thereto.

Provided that a plurality of pairs of values can be detected, a data mesh (grid) or pattern may be generated which describes the current haircut of the subject 12.

Further, the system 10 comprises a computing device 40. The computing device 40 may be arranged as a mobile device, for instance a tablet computer, a mobile phone, and such like. The computing device 40 comprises a processing unit 42 arranged to process data. Further, a feedback unit 44, 46 may be provided. For instance, the feedback unit comprises a screen 44. Further, the feedback unit may comprise a speaker 46. However, also the device 20 itself may be provided with a feedback unit 48. The feedback unit 48 may be arranged as a haptic feedback unit or a force feedback unit. Also visual feedback and/or sound feedback may be provided via the device 20.

In one embodiment, at the display or screen 44, user feedback 50 is provided. For instance, user feedback 50 comprises a representation of a head or scalp portion of the subject 12 (or of a model) and an indication of a region of interest in which a refined measurement should be performed. Further, the user feedback 50 may involve an indication of a proposed movement speed of the device 20, a proposed movement direction of the device 20, etc.

Hence, the system 10 may be arranged to guide the user so as to accomplish the haircut recording process in a considerably short period of time and at a desired accuracy level. The level user knowledge and awareness required for the completion of the haircut recording process may be lowered which makes the system 10 easy to operate also by relatively low-skilled customers/users.

A main advantage of the system 10 is that feedback to the user may be provided which allows for a sectional refinement of the measurement mesh/pattern. On the other hand, there is no need to refine the sampling/measurement process at a region of the haired portion 16 where actually constant hair property values have been detected. Rather, in regions of the haired portion 16 where a considerably large rate of change is detected, a refined measurement may be suggested on a case by case basis.

Figure 2:
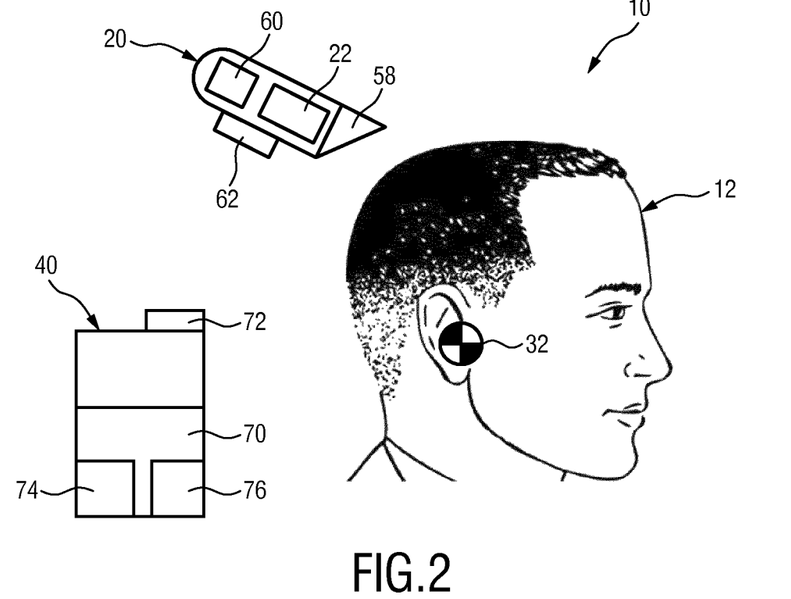
FIG. 2 shows another alternative layout of an embodiment of a haircut recording system.
Figure 3:
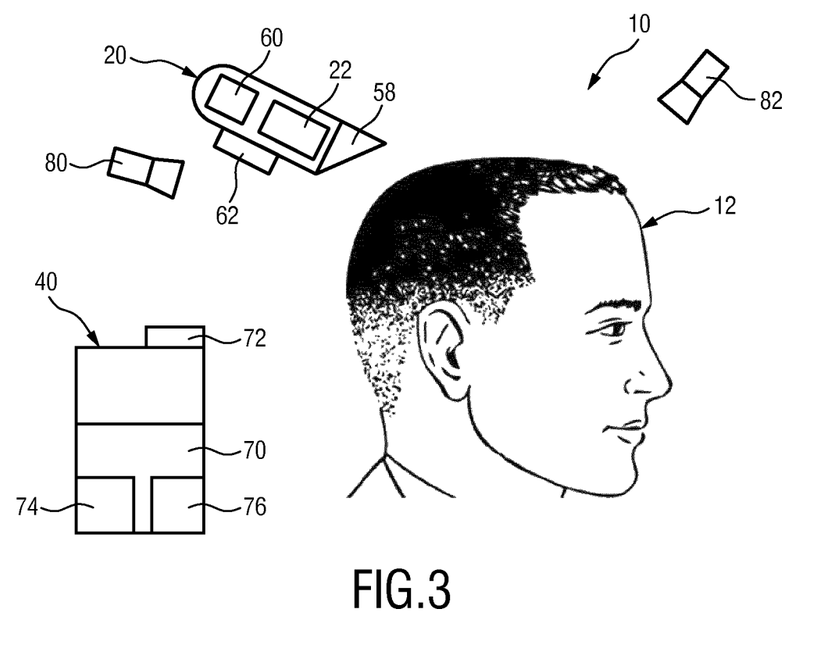
FIG. 3 shows yet another exemplary embodiment of a haircut recording system.

FIG. 2 illustrates an exemplary embodiment of a haircut recording system 10 which generally corresponds to the embodiment already explained above in connection with FIG. 1. Further, FIG. 3 illustrates yet another exemplary embodiment of a haircut recording system 10 having a general layout which also corresponds to the layout as illustrated in FIGS. 1 and 2.

In FIG. 2, the system 10 comprises a hand-held device 20 implementing a measurement unit 22. Further, an engagement section 58 is provided which is arranged to contact the skin or scalp of the subject 12 so as to detect a hair property value, particularly a hair length value. Further, the device 20 comprises a position indication section 60. The position indication section 60 allows to detect a position of the device 20 and to track the device 20 accordingly. For recording the present haircut of the subject 12, the device 20 is moved along the head or scalp. During this movement, samples are generated. Samples involve a current position of the device 20 and a hair property value, particularly a hair length, assigned thereto. In FIG. 2, the positional reference 32 is a wearable reference worn by the subject 12. For instance, an ear wearable reference as disclosed in WO 2013/163999 A1 may be utilized. Consequently, a relative position of the device 20 with respect to the positional reference 32 may be detected and tracked. Hence, a current position of the device 20 at the head of the subject 12 can be processed. The device 20 further comprises a control interface 62 through which data and information may be exchanged.

In one embodiment of the system, the device 20, the position detection unit 30 and the computing device 40 are arranged to communicate with one another, preferably in a wireless fashion. Consequently, also the computing device 40 shown in FIG. 2 comprises a control interface 72. In addition, also the positional reference 32 or the position detection unit 30 as such may be provided with a corresponding control interface (not shown in FIG. 2). Hence, a record control unit 70 of the computing device 40 may be supplied with samples which comprise pairs of values relating to an actual position of the device 20 and a corresponding hair property value. By moving the device 20 along the head of the subject, a virtual data representation of the haircut may be obtained. In other words, a data mesh or data set may be generated which represents the shape of the head 14 and the corresponding appearance of the hair of the subject 12.

So as to improve the haircut recording process, a control loop section 74 is provided at the computing device 40. The control loop section 74 is arranged to process and assess a quality parameter and to induce corrective user feedback in case a significant deviation of the quality parameter has been detected. If this is the case, the user may be prompted to repeat a previous movement and/or to move the device 20 to a certain region where a refined recording is desired. In a more general sense, the quality parameter may be referred to as condition parameter. Further, the quality parameter may be arranged as an accuracy parameter.

Further, a hair profile allocation section 76 is provided in the computing device 40. The hair profile allocation section is used to map detected hair property values so as to eventually generate an overall data representation of the shape and appearance of the present haircut.

Generally, the device 20 may be moved in an arbitrary and/or targeted fashion. For instance, an initial recording stage may involve an arbitrary movement of the device 20 along and with respect to the scalp of the subject 12. The system 10 may be arranged in a self-learning fashion and indication which haired region still needs to be measured and sampled. Hence, a completion stage may follow in which the user is prompted to cover areas that have not been measured yet. Further, a refinement stage may follow in which certain areas are repeatedly measured and samples so as to fulfill quality (accuracy) goals.

The arrangement of FIG. 3 basically differs from the arrangement of FIG. 2 in that remote visual position sensors 80, 82 are provided for position detection. For instance, video cameras may be provided so as to monitor the subject 12 and the device 20 from different positions so as to enable a three-dimensional tracking of the position of the device 20 with respect to the head of the subject 12. Images obtained by the position sensors 80, 82 may be processed so as to detect and track the requested position (e.g., contact of device 20 and scalp) accordingly. Also in this way, a current position of the device 20 may be detected and assigned to corresponding hair property values. Needless to say, remote position sensors as illustrated in FIG. 3 and wearable positional references as illustrated in FIG. 2 may be combined so as to further improve the position detection performance.

Figure 4:
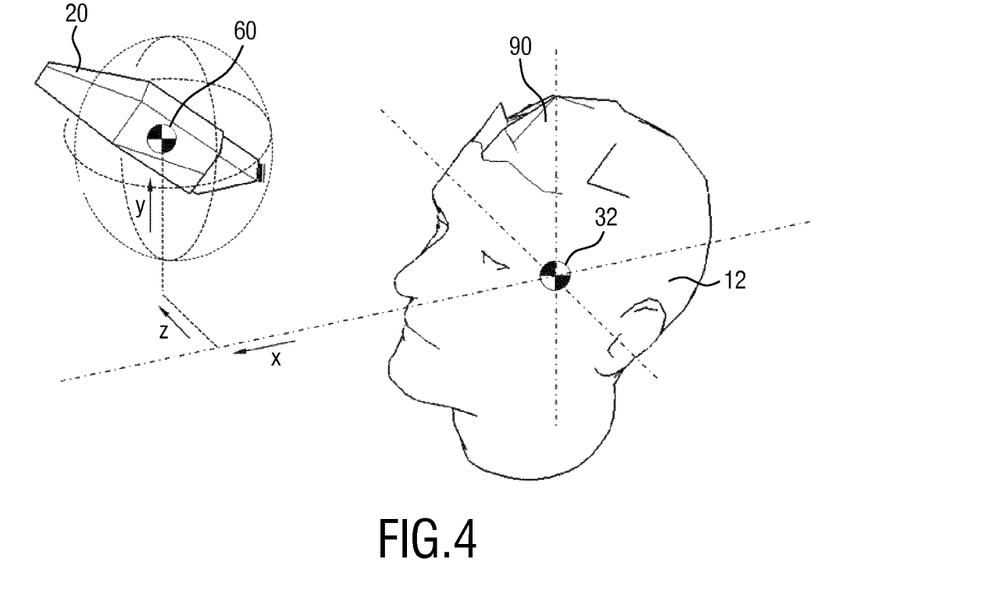
FIG. 4 shows a simplified schematic perspective representation of a head of a subject of interest in relation to which a hand-held device for haircut recording is arranged.

FIG. 4 exemplarily illustrates a representation of a subject's 12 head. Further, a coordinate system is indicated in FIG. 4 by dot-dashed lines. Arrows indicated by X, Y and Z indicate respective directions. A (virtual) origin of the coordinate system of FIG. 4 is for instance in the center of the head of the person 12. Consequently, a hair map 90 including a head shape and hair length values may be obtained when a current position of the device 20 is tracked and, at the same time, hair property values are acquired. A relative position of the position indication section 60 with respect to the positional reference 32 is required to assign a currently detected hair property value to a current position of the head.

Figure 5:
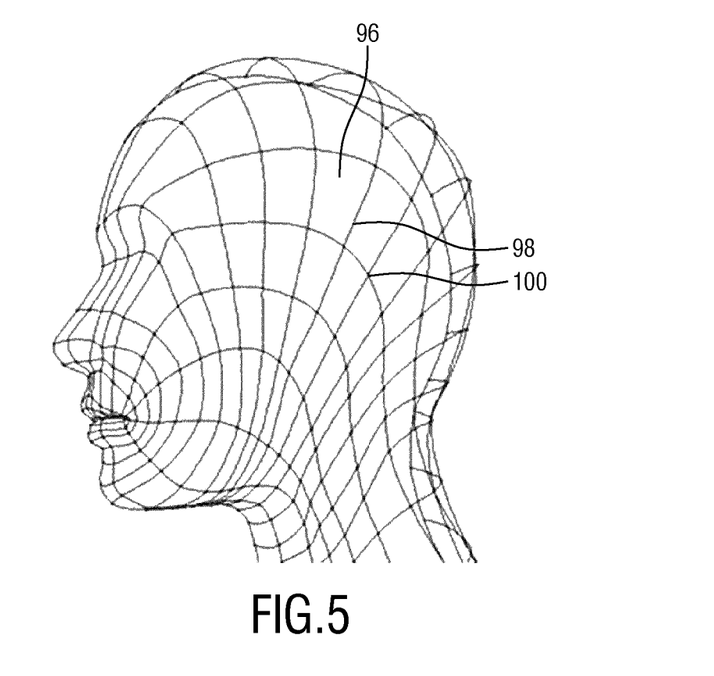
FIG. 5 shows a simplified side view of a head to which an illustrative data point pattern or mesh is applied.

FIG. 5 illustrates a three-dimensional mesh 96 including lines 98 and nodes 100. For instance, there may be latitude and longitude lines. Other structures/patterns may be envisaged. When respective lines 98 are crossing one another, a node 100 may be defined. It is not necessarily required that the user exactly follows a predefined arrangement of the mesh 96. Rather, a current path of movement of the device 20 may define a line 98 and may eventually form the current mesh. Further, it is not necessarily required that property values including a position value and a hair property value are recorded exactly at the nodes 100. Rather, further data points (between nodes) may be used. In case movement paths of the device 20 cross one another and define nodes 100, respective pairs of values may be compared to one another so as to assess the validity of the measurement. The mesh may 96 be also defined by spot measurement, e.g. by repeatedly tapping (contacting) the skin or scalp 14 with the device 20.

Figure 6:
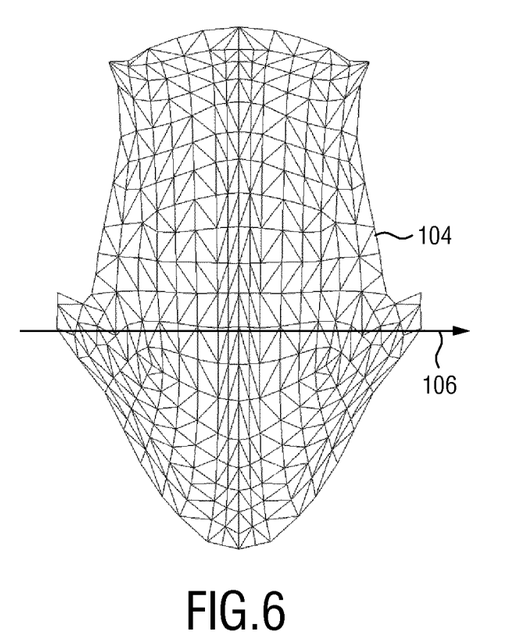
FIG. 6 shows a flat view of an exemplary haired portion (scalp) to which a data mesh or pattern is applied.

FIG. 6 illustrates a rolled-out (flat) representation of a scalp of a subject. As with the illustration of FIG. 5, a mesh 104 is provided, primarily for illustrative purposes. Within the area covered by the mesh 104, pairs of values are recorded so as to eventually define the desired hair property map. By way of example, reference numeral 106 indicates an exemplary path of movement of the device 20.

However, it is again emphasized that also spot measurement may be envisaged, wherein the user moves the device 20 in a back and forth fashion where the device 20 intermittently approaches or contacts the skin at certain measurement spots, wherein a transfer between two measurement spots may include an intermediate lifting of the device 20. Also based on spot measurement, a plurality of samples may be obtained so as to eventually derive a hair property profile. The spot measurement may involve a pulling movement, such that the length of hair can be detected when the device 20 is moved away from the scalp 16.

Figure 7:
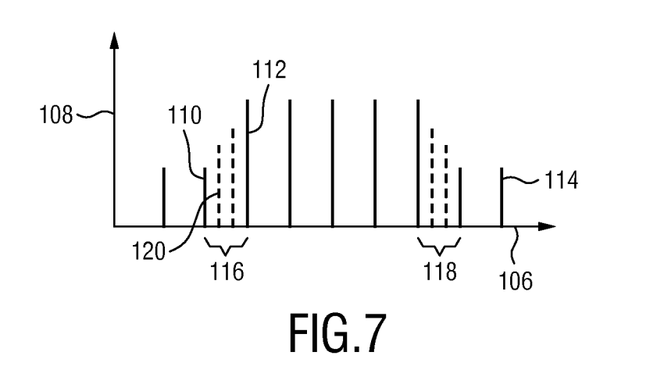
FIG. 7 illustrates a simplified diagram presenting hair property values obtained at an exemplary record path.

In this context, further reference is made to FIG. 7 illustrating a hair property chart. The chart of FIG. 7 includes an axis of abscissas which represents the path 106 illustrated in FIG. 6. An ordinate axis 108 of FIG. 7 exemplifies hair property values obtained at certain points of the path 106. Respective samples are indicated in FIG. 7 by reference numerals 110, 112, 114. In a central portion of the path 106, relatively constant values are recorded, refer to the samples 112. In side ranges of the path 106, also relatively constant values are recorded, refer to the samples 110, 114. However, in transition zones or intermediate zones 116, 118, a huge rate of change is present.

Provided that an initial measurement is based on a relatively large distance between two samples (continuous lines in FIG. 7), user feedback may be provided so as to prompt a user to repeat the recording process at the intermediate zones 116, 118. In this way, intermediate samples 120 may be recorded which refine the measurement at transition areas. Based on a coarse measurement, a supplemental fine measurement may be performed. Consequently, a beneficial trade-off between sample rate/sample density and recording time may be obtained. Needless to say, user feedback may be also provided in cases where even a coarse measurement is not accomplished by indicating respective areas without sufficient coverage. Hence, the user may be supported and guided by the system 10 which greatly simplifies the haircut recording process.

It goes without saying that a refinement of the measurement values does not necessarily requires an exact repetition of the movement of the device 20 along the very same path 106. Also neighboring paths may be used for data refinement/enrichment and quality improvement.

Figure 8:
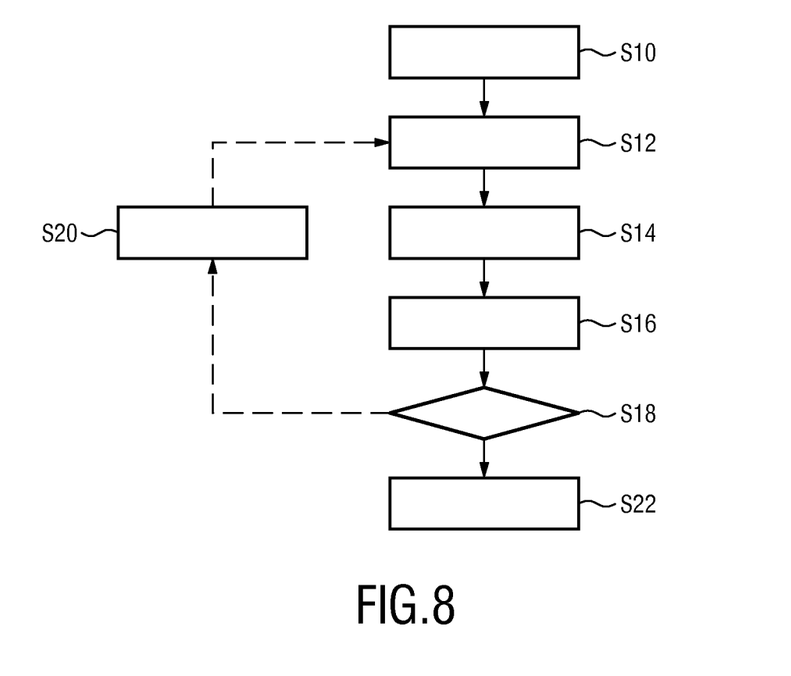
FIG. 8 shows a simplified block diagram of an embodiment of a haircut recording method.

Further reference is made to FIG. 8 illustrating an exemplary embodiment of a haircut recording method in accordance with the present disclosure.

In an initial step S10, a hair property measurement unit, particularly a hair length measurement unit, is provided. In a subsequent step S12, the measurement unit is arranged adjacent to a haired portion, particularly a head portion, of a subject of interest. Further, the step S12 includes a movement of the measurement unit through the subject's hair.

A further step S14 may follow which includes detecting an actual position of the measurement unit. Further, a step S16 may be provided which includes detecting a hair property value of interest, particularly a hair length representing value. Needless to say, the steps S14, S16 may be performed basically in a synchronous fashion. For instance, a certain sampling rate may be applied according to which respective pairs of values are recorded.

A further step S18 may follow in which a total coverage of the recording procedure is evaluated. In case it is determined in the step S18 that further measurements are required, a step S20 follows. In a step S20, user feedback may be provided prompting the user to repeat the steps S12, S14, and S16. The step S18 may, on the one hand, address an overall coverage. On the other hand, the step S18 may address a condition parameter, particularly a quality parameter. The quality parameter may for instance involve a rate of change of the hair property value of neighboring measurement spots/samples. In case a steep transition and/or an unexpected/unpredicted value is detected, it may be beneficial to conduct further (intermediate) measurements so as to record the transition in more detail. Consequently, appropriate instructing user feedback may be provided in the step S20.

When it is assessed in the step 18 that sufficient information and data is obtained, the method may terminate in the step S22. In the step S22, a hair property profile, for instance a hair length profile, of the subject of interest is provided. Based on the profile provided in the step S22, the current haircut of the subject may be reproduced at a later time.

Figure 9:
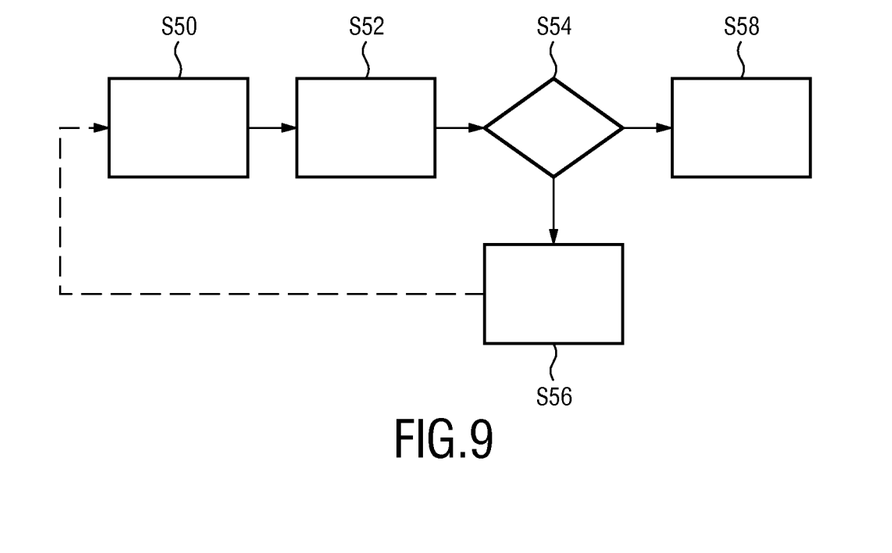
FIG. 9 shows another simplified block diagram illustrating a control loop implemented in a haircut recording procedure.

FIG. 9 illustrates a further exemplary embodiment of a haircut recording method. The procedure explained in connection with FIG. 9 may be regarded as a supplement to the method as shown in FIG. 8.

In FIG. 9, a step S50 is provided which includes recording a hair property profile. This may for instance involve operating a haircut recording system in a first, coarse setting in accordance with a coarse measurement (low sampling rate/sampling density). Consequently, a coarse mesh/pattern of data sets may be obtained. An evaluation step S52 may follow in which the hair property profile is evaluated so as to assess or derive a quality parameter. For instance, the quality parameter may include a rate of change value and/or a deviation of detected values from interpolating values between neighboring measurement spots. In either case, it may be expected that a transition is provided which requires a refined measurement.

In this connection, in a step S54, it is assessed whether the quality parameter is within/below a defined limit/threshold, or exceeds the limit. In the latter case, a step S56 follows which includes user feedback so as to prompt the user to perform a certain corrective action. The corrective action may for instance involve a refined measurement by repeatedly moving a hand-held device of the haircut recording system to a desired location where a huge transition is expected. Corrective action may also involve decelerating the hand-held device.

Then, again the step S50 may follow in which the hair property profile is updated. Consequently, a new evaluation may take place. When it is assessed in the step S54 that the quality parameter is within the defined limit, the generation of the hair property profile may be accomplished in a step S56.

Figure 10:
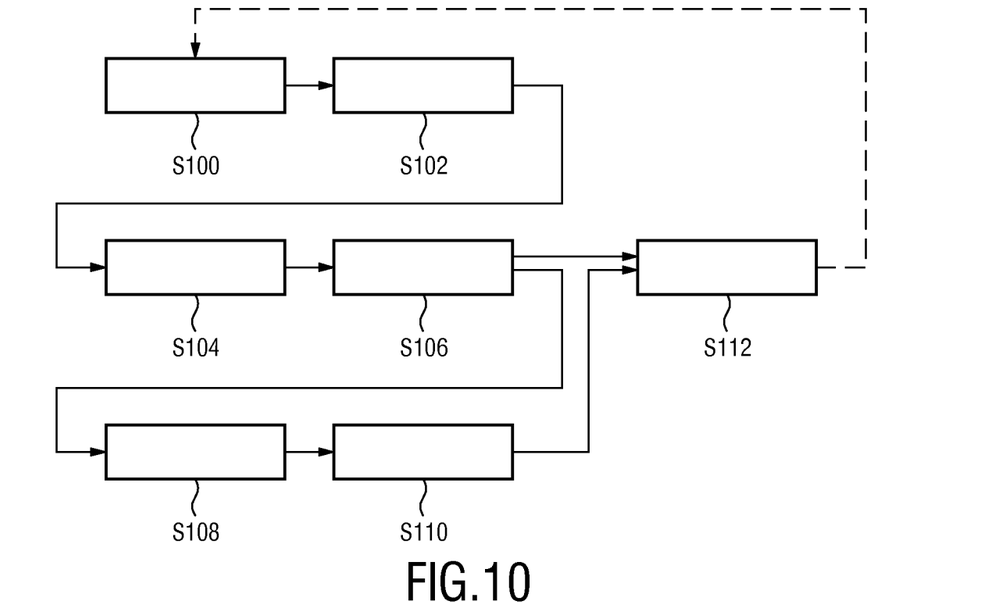
FIG. 10 shows yet another simplified block diagram illustrating an exemplary embodiment of a hair length measurement procedure.

Further reference is made to FIG. 10 illustrating an exemplary embodiment of a method in accordance with the present disclosure. More particularly, the procedure illustrated in FIG. 10 relates to a detection of a hair property value of interest, particularly of a hair length value. Consequently, steps S100 to S112 of FIG. 10 may form part of the overall method discussed herein. The steps S100 to S112 are discussed and explained hereinafter with reference to a measurement unit that implements a hair length measurement comb. As already indicated above, further approaches to hair property measurement, particularly to hair length measurement may be envisaged.

A step S100 relates to a state where no hair is detected or present in a comb attachment of a measurement unit of a hand-held device. In a subsequent step S102, the hand-held device is moved to approach a haired portion of a subject of interest, particularly the head of the subject of interest. Step S102 may involve respective position and/or approaching monitoring and detection.

Eventually, in a step S104, a contact with the subject's skin may be detected. Particularly with reference to head hair, a scalp contact may be detected. For hair length measurement, the skin or scalp of the subject serves as a reference or basis. The step S104 may trigger or initiate further recording steps. For instance, a step S106 may follow which involves obtaining a record of the current position of the hand-held device at the scalp or head of the subject of interest. Further, a step S108 may be present which involves detecting a hair-to-no-hair change in the attachment comb. To this end, for instance optical/visual sensing may be utilized. When a respective contrast (hair-to-no-hair change) is detected, a length measurement can be performed which is included in a corresponding step S110. Consequently, a hair property value, particularly a hair length value, may be detected. In a following step S112, a respective sample may be registered. The sample includes a position record and a hair property value record. As indicated by a dashed arrow, the steps S100 to S110 may be repeatedly performed so as to define a hair property or hair length profile covering the basically whole head hair of the subject of interest.

Figure 11:
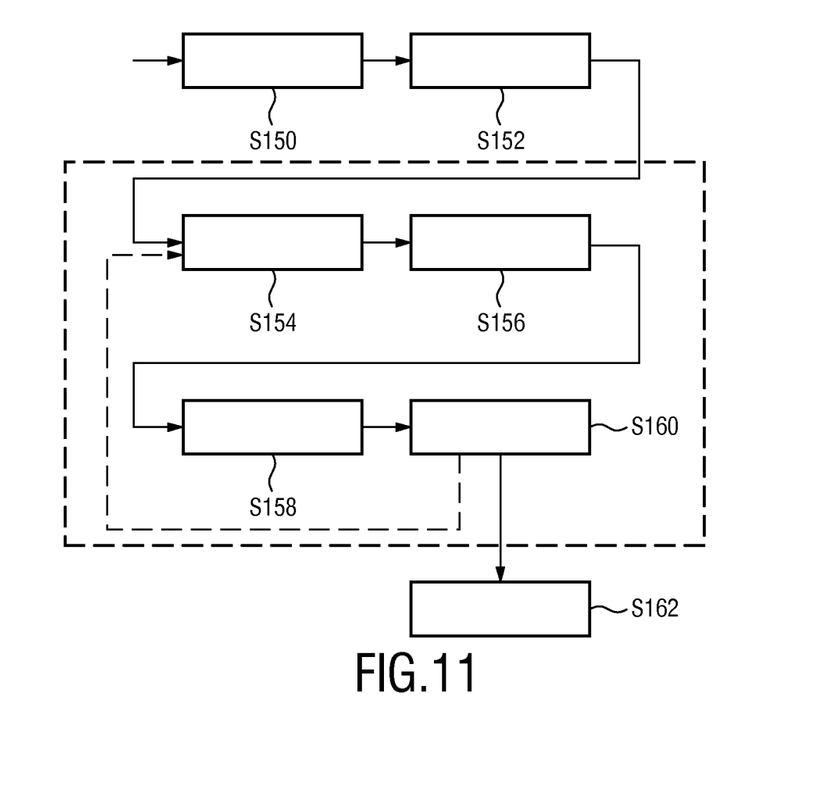
FIG. 11 shows another simplified block diagram illustrating an embodiment of a measurement refinement method in accordance with the present disclosure.

In the following, an exemplary measurement and refinement approach is described in more detail with reference to FIG. 11.

In brief, the method involves a step S150 which relates to an initial start point measurement. A further step S152 involves a determination of areas which actually qualify for refinement, due to present deviations. Further, a step S154 may follow which involves user feedback, particularly suggesting the user to measure further points in a to-be-refined sub-area. In a subsequent step S156 the user may perform an actual measurement of at least a further point in the to-be-refined area. A downstream step S158 may follow which involves the definition of the new measurement (sub) area for further processing. For instance, the currently measured point may basically enable a subdivision of an area into a number (e.g. three) of sub areas. In a further step S160 an assessment of a new measurement (sub) area may be performed which may again involve the determination of deviations. If detected deviations are still too large, the step S154 may follow, e.g. a refinement loop is established. Consequently, a step S162 may follow which involves the collection of measurement values and, eventually, an accomplishment of the hair length profile recording procedure.

An exemplary embodiment of the method in accordance with FIG. 11 will be described in more detail hereinafter. For illustrative purposes, further reference is made to FIGS. 12, 13 and 14. For a smart haircutting appliance there is a practical limit to the resolution it may achieve, i.e. over what distance over the head it will differentiate in length. Also there is a practical limit to a haircut resolution, on what size does a haircut materially differ in length to define the style. For instance, length information with a spatial resolution of ~10 mm as a practical value defines a haircut for the purpose of a smart haircutting appliance.

To record a full hair length profile, measuring the head at a 10 mm resolution is to be avoided as it would be too effortful. Instead, it is proposed to measure a limited number of points with interpolation of values to give a valid length for every location on the head. Hence, based on a limited number of measurement spots (points), the overall hair cut may be described.

For instance, an initial measurement may include five points (e.g., front, back, left side, right side, and top). Having measured the initial five points, the need for additional measurements can be determined. In case there is little variation in length of the five measured start points (e.g. less than 12%), it may be assumed to be a fairly even cut. Any additional measurements may be regarded optional, instead of mandatory, for the user.

However, total even haircuts are not very common. Given the reality of different hairstyles, however, it is more practical to assume uncertainty and prompt for an additional measurement for every starting area.

By way of example, a model area may be configured as a surface-area of a truncated sphere bounded by lines between a set of three points. Other models describing the scalp may be envisaged. Based one the defined starting points there is then performed a measuring recursion into detail, but only where needed, guided by the detected measured lengths, estimated lengths and the calculation of deviations. Hence, a great trade off between accuracy and measurement time/efforts may be achieved.

Figure 12:
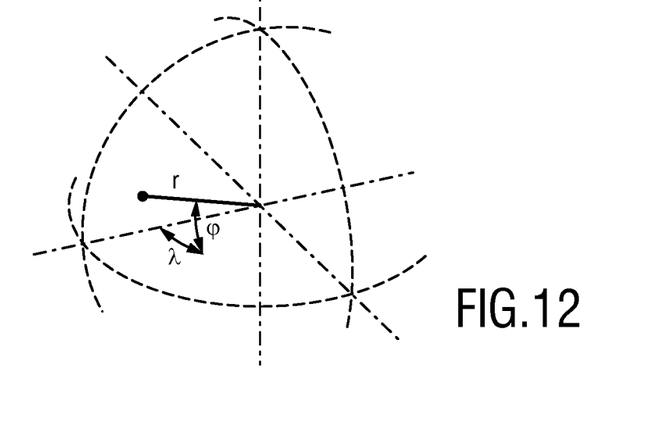
FIGS. 12, 13 and 14 show simplified coordinate systems illustrating a head model representation which is used for exemplary measurement refinements.

Locations on the head may be for instance recorded as spherical polar coordinates. For the purpose of an exemplary hair length profile, an actual spatial coordinate is not needed. The angle readings for latitude ($\varphi$) and longitude ($\lambda$) are sufficient for recording and application and the radius value r can be ignored, assuming that typically a (human) head has a certain standard size. By way of example, assuming a typical radius of ~80 mm, this means that for the ~10 mm resolution an angular grid resolution of ~7° (degrees) would be desired. In this context, reference is made to FIG. 12 illustrating a schematic reference head/scalp model where spherical positions are described by latitude ($\varphi$), longitude ($\lambda$) and radius (r).

The general approach for the recording of the hair length profile is to assess if there is remaining uncertainty for a points-bounded area. If there is uncertainty (deviations beyond a defined threshold), the user is prompted for an additional measurement in that area. Then the procedure is repeated for the subdivided area(s) or until the smallest relevant subdivision of about 7° degrees is reached. Hence, sufficient refinement may be achieved. Given (already processed) boundary points are indicated by $P_1$, $P_2$ and $P_3$ in FIG. 13.

Figure 13:
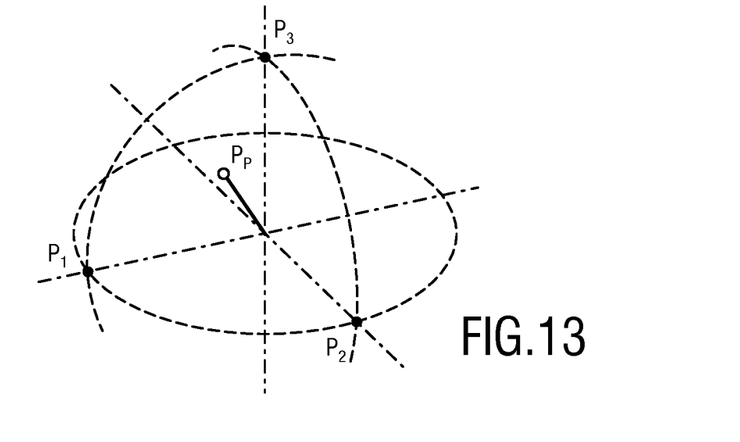
Figure 14:
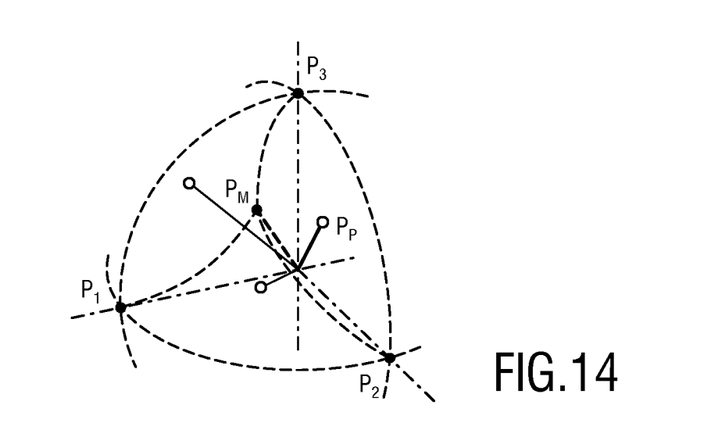

The prompted coordinates (hereinafter referred to as prompted points ($P_P$)) may be determined, in accordance with an exemplary embodiment, by calculating an average of the values for latitude and longitude of the three bounding points (of the spherical model surface). Further, the actual location where the user takes a measurement ($P_M$) can differ from the exact (ideal) prompted point ($P_P$), this location $P_M$ with $\varphi_m$ and $\lambda_m$ (latitude and longitude deviation) is recorded and also an associated length value is recorded. Needless to say, also the start points (five points as indicated above) will not be at their ideal locations but only at the approximate coordinates where the user actually took the measurement. FIG. 13 indicates a prompted/proposed point $P_P$ arranged in a central region of the spherical segment defined by the points $P_1$, $P_2$ and $P_3$. FIG. 14 shows a selected point $P_M$ in the vicinity of the prompted point $P_P$.

For the new datapoint $P_M$, the nearest three already measured points (within the above approach) are calculated. The (longitudinal or angular) distance over the sphere to $P_M$ for every recorded point $P_C$ is calculated. This can be for instance done using a Haversine function (giving greatcircle distances between two points on a sphere from their longitudes and latitudes) or by a simpler linear distance. However, as the primary purpose is to sort, linear instead of the spherical distances may provide basically equal results, even though the actual distance values are not correct. So for every data points $P_M$ and $P_C$ the distance may be calculated with $x=(\lambda_m-\lambda_c)*\cos((\varphi_c+\varphi_m)/2)$ and $y=(\varphi_m-\varphi_c)$, providing a distance as a square root of $x^2+y^2$.

Sorting the list of calculated distances to the new point $P_M$ provides the nearest three points. By way of example, the nearest three data points are then taken as the enclosing triangle for the new $P_M$ measurement. The interpolation of the three length values of these corners to determine the predicted length value for $P_M$ can be done in several ways. For example a quadratic interpolation or a bi-linear interpolation can be done. An exemplary simple and practical option is to do a simple average value for the lengths. Needless to say, a region of interest may be defined by more than three data points.

If the measured length differs from the predicted value by more than a defined threshold value (e.g. 12%) and the distance is larger than the resolution threshold (e.g. 7 degrees), then additional measurements will be proposed. Additional measurements can be suggested for all subdivided areas for refinement (e.g. three triangle-areas), or selectively only in the highest deviating area(s).

Hence, guided by the delta of $P_M$ to a pair of earlier measured points (say, $P_2$ and $P_3$), e.g. a deviation of $P_M$ to an average or another calculated value, it may be decided whether or not further refinement is necessary in the area defined by [$P_M$, $P_3$, $P_2$]. This refinement may be repeated for any other sub area. A resulting new prompted point $P_P$ for the set [$P_M$, $P_3$, $P_2$] is indicated in FIG. 14.

If the measured length is within the defined difference threshold or the distance to neighboring points is less than the resolution threshold explained above, no further refinement for that area is proposed. The area defined by [$P_1$, $P_2$, $P_3$] is then deemed scanned and noted as such. In that case the point $P_M$ is marked as complete. Any area that includes a 'complete' point in its definition does not require further prompting.

By way of example, it is possible to start with fewer than the five starting data points. It is further emphasized that the above shall be understood as an exemplary embodiment and shall not be construed as limiting the scope of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A haircut recording method comprising acts of:
providing a haircutting system having a hair property measurement unit configured to measure at least a hair length;
arranging the measurement unit adjacent to a haired portion;
detecting an actual position of the measurement unit;
detecting hair property values of interest including a value representing the at least hair length;
recording a present haircut by the haircutting system, including acts of:
tracking the actual position of the measurement unit to obtain position values of the measurement unit,
assigning the detected hair property values to the position values of the measurement unit, and
recording pairs of values including the detected hair property values and the position values of the measurement unit assigned to the detected hair property values,
deducing a condition parameter based on the recorded pairs of values to reproduce the present haircut that was present at a time of the recording of the pairs of values; and
providing by the haircutting system user feedback based on the deduced condition parameter.

2. The method as claimed in claim 1, wherein the condition parameter is based on at least one of:
a length value including one of an absolute length value and a relative length value,
a positional value including a head topology value,
a movement speed value including one of an absolute movement speed value and a relative movement speed value,
a sampling parameter including one of a sampling density and a sampling rate,
a rate of change value including one of a rate of temporal change value and a rate of positional change value, and
an area coverage value.

3. The method as claimed in claim 1, wherein the act of recording a present haircut includes the acts of:
monitoring the condition parameter;
detecting a deviation of the condition parameter; and
providing corrective user feedback so as to reduce the detected deviation.

4. The method as claimed in claim 1, wherein the act of providing user feedback includes at least one of the following acts:
requesting a repetition of a previous measurement of the measurement unit;
requesting a deceleration when moving the measurement unit;
indicating a transitional region where huge length changes are present in neighboring portions;
indicating a region where a refined measurement is requested; and
indicating a region where no measurement has been performed so far.

5. The method as claimed in claim 1, wherein the act of providing user feedback further includes at least one of the following acts:
providing visual feedback;
providing haptic feedback; and
providing sound feedback.

6. The method as claimed in claim 1, wherein the measurement unit is operable in a basic setting involving a coarse-meshed measurement, and in a fine setting involving an at least sectionally applied fine-meshed measurement.

7. A haircut recording system comprising:
a computing device comprising a feedback unit;
a hand-held device comprising a hair property measurement unit, the measurement unit being configured to detect hair property values of interest including a value representing the at least hair length, when the measurement unit is arranged adjacent to a haired portion;
a position detection unit configured to detect an actual position of the measurement unit; and
a control unit configured to:
operate the position detection unit for tracking the actual position of the measurement unit,
operate the measurement unit for assigning detected hair property values to position values,
record the detected hair property values,
deduce a condition parameter based on the recorded hair property values to reproduce a haircut that was present at a time of the recording of the detected hair property values, and
cause providing user feedback based on the deduced condition parameter.

8. The system as claimed in claim 7, wherein the record control unit comprises a control loop section configured to monitor the condition parameter, detect a deviation of the condition parameter, and provide corrective user feedback so as to reduce the detected deviation.

9. The system as claimed in claim 7, wherein the user feedback is provided via at least one of the computing device including a display, and the hand-held device including at least one of a haptic actuator and a sound source.

10. The system as claimed in claim 7, wherein the hair property measurement unit is configured as a hair length measuring unit.

11. The system as claimed in claim 7, wherein the position detection unit includes a positional reference and a relative position detection unit for detecting a position of the measurement unit with respect to the positional reference.

12. The system as claimed in claim 7, wherein the position detection unit is configured as a mediate position detection unit to detect a present topology including a head topology, based on a plurality of position measurement samples, and to match the head topology and an overall topology model.

13. A computer program comprising program code stored on non-transitory computer readable medium for causing a computer to carry out the acts of the method as claimed in claim 1, when said computer program is carried out on a computing device.

14. A haircut recording method comprising acts of:
providing a hair cutter including a hair property detector configured to measure at least a hair length;
arranging the hair property detector adjacent to a haired portion;
detecting an actual position of the hair property detector;
detecting hair property values of interest including a value representing the at least hair length;
recording by the hair cutter a present haircut,
wherein the recording act includes acts of:
tracking the actual position of the hair property detector,
assigning the detected hair property values to position values of the hair property detector based on the tracking act, deducing a condition parameter based on the assigning act to reproduce the present haircut that was present at a time of the recording act; and providing by the hair cutter user feedback based on the deduced condition parameter.

15. The method of claim 14, wherein the recording act further includes an act of recording the detected hair property values, and wherein the detected hair property values, and wherein the condition parameter is based on a sampling parameter of the hair property detector including one of a sampling density and a sampling rate.

16. The method of claim 14, wherein the condition parameter is based on at least one of:
   a length value including one of an absolute length value and a relative length value of the at least hair length,
   a positional value of the hair property detector including a head topology value,
   a movement speed value including one of an absolute movement speed value and a relative movement speed value of the hair property detector,
   a rate of change value including one of a rate of temporal change value and a rate of positional change value of the detected hair property values, and
   an area coverage value.

17. The method of claim 14, wherein the act of recording a present haircut includes the acts of:
   monitoring the condition parameter;
   detecting a deviation of the condition parameter; and
   providing corrective user feedback so as to reduce the detected deviation.

18. The method of claim 14, wherein the act of providing user feedback includes at least one of the following acts:
   requesting a repetition of a previous measurement of the measurement unit;
   requesting a deceleration when moving the measurement unit;
   indicating a transitional region where huge length changes are present in neighboring portions;
   indicating a region where a refined measurement is requested; and
   indicating a region where no measurement has been performed so far.

19. The method of claim 14, wherein the act of providing user feedback includes at least one of the following acts:
   providing visual feedback;
   providing haptic feedback; and
   providing sound feedback.

* * * * *